R. J. WILKIE.
BOWLING PIN.
APPLICATION FILED MAR. 8, 1921.
1,393,655.
Patented Oct. 11, 1921.
Fig. 1.
Fig. 2.
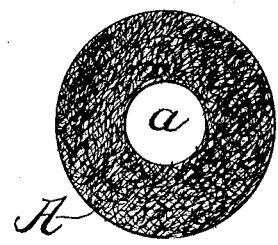
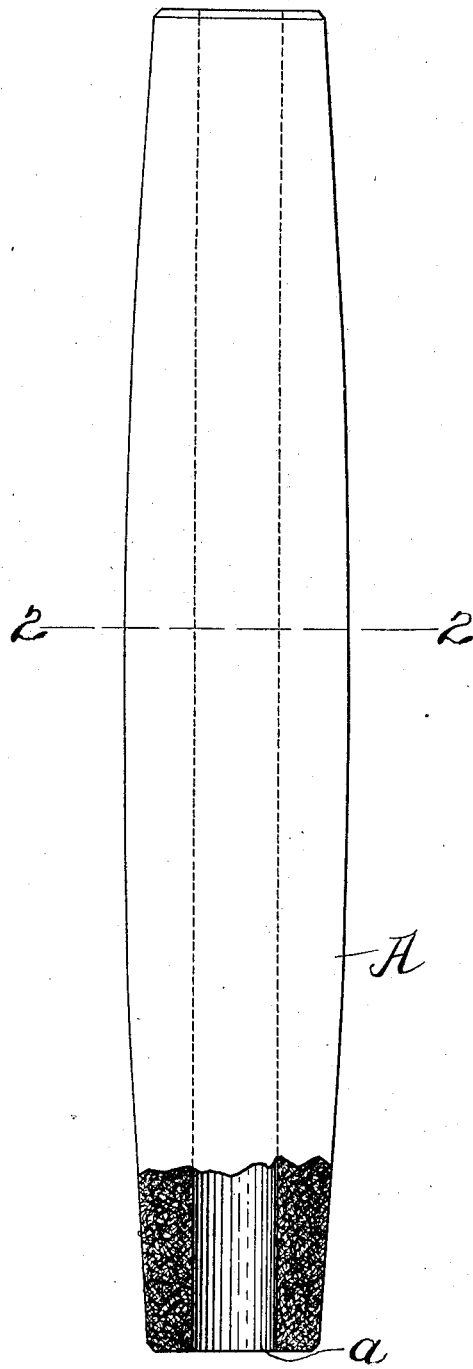
Inventor:
Robert J. Wilkie
by George A. Rockwell,
Atty.

UNITED STATES PATENT OFFICE.

ROBERT J. WILKIE, OF NEWTON, MASSACHUSETTS, ASSIGNOR TO STOWE & WOODWARD COMPANY, OF NEWTON UPPER FALLS, MASSACHUSETTS, A CORPORATION OF MASSACHUSETTS.

BOWLING-PIN.

1,393,655.

Specification of Letters Patent.   Patented Oct. 11, 1921.

Application filed March 8, 1921. Serial No. 450,782.

*To all whom it may concern:*

Be it known that I, ROBERT J. WILKIE, a citizen of the United States, and resident of Newton, in the county of Middlesex and State of Massachusetts, have invented a new and useful Bowling-Pin, of which the following is a specification.

The principal object of my invention is to provide a bowling pin which will be useful in place of the present maple pin which is not only becoming very difficult to obtain but is also becoming extremely expensive.

My invention consists primarily in a bowling pin that is indestructible, that is more uniform than a wood pin, that will hold its shape indefinitely and that in its action will very closely resemble a wood pin.

In perfecting my invention I have made a number of tests. I have made a hard rubber pin of solid hard rubber which is very likely to crack and chip when the ball comes in contact with it. I have incorporated with this hard rubber in my tests various percentages of wood sawdust, wood flour (which is wood finely ground and sifted), wood chips, cork in various forms, and they have all proved to be impractical when vulcanized to become hard rubber because they were brittle and would chip off and because they were too heavy.

I have discovered that a bowling pin made of wool felt or its equivalent and having just enough rubber to bind the felt together, the rubber not being vulcanized to become hard rubber, will have the desirable qualities that I have stated above. I prefer to use about 75% of wool felt and about 19% of rubber with preferably 5% of sulfur and 1% of oil.

In the drawing—

Figure 1 is an elevation, partly in section, of a bowling pin embodying my invention; and Fig. 2 is a section on line 2—2 of Fig. 1.

My bowling pin A, as shown in the drawings, is of the candle pin type although my invention is applicable to other types. I prefer to provide a central aperture *a* extending clear through the pin from top to bottom as this makes the pin lighter and does not detract from any of the above-named advantages.

In making my pin I prefer to put the wool felt on a mixing mill and incorporate the rubber, sulfur and oil until they are well mixed, then forcing the whole material out of a tubing machine of the proper size for the pin, then putting it in forms and exposing it to heat of the required temperature to give it the proper cure, which temperature has to be determined according to the size and shape, but without vulcanizing the rubber so as to be hard and then removing the finished article from the mold or forms.

Among the advantages of my pin I may point out that when exposed to strain it will have the resiliency of a close texture of felt that will resemble in its action very closely indeed the action of a wood pin; and also that my pin has no stretch but considerable resiliency because of the fact that it is substantially a wool felt pin with just enough rubber to hold the wool felt together and this rubber is not the commonly-known hard rubber.

What I claim is:

1. A bowling pin made of wool felt and having a binder of relatively soft rubber.

2. A bowling pin made substantially of wool felt and having a binder of relatively soft rubber and comprising also sulfur and oil.

3. A bowling pin comprising substantially 75 parts of wool felt, substantially 19 parts of relatively soft rubber; substantially 5 parts of sulfur and substantially 1 part of oil.

4. A bowling pin made of wool felt and having a binder of relatively soft rubber and having a central hole.

ROBERT J. WILKIE.